(12) United States Patent
Herzog et al.

(10) Patent No.: US 11,241,838 B2
(45) Date of Patent: Feb. 8, 2022

(54) METHOD AND SYSTEM FOR THE ADDITIVE MANUFACTURING OF AN OBJECT

(71) Applicant: CONCEPT LASER GMBH, Lichtenfels (DE)

(72) Inventors: Frank Herzog, Lichtenfels (DE); Tanja Kroher, Weitramsdorf (DE)

(73) Assignee: CONCEPT LASER GMBH, Lichtenfels (DE)

( * ) Notice: Subject to any disclaimer, the term of this patent is extended or adjusted under 35 U.S.C. 154(b) by 543 days.

(21) Appl. No.: 16/093,591

(22) PCT Filed: Mar. 21, 2017

(86) PCT No.: PCT/EP2017/056663
§ 371 (c)(1),
(2) Date: Oct. 12, 2018

(87) PCT Pub. No.: WO2017/207127
PCT Pub. Date: Dec. 7, 2017

(65) Prior Publication Data
US 2019/0126559 A1 May 2, 2019

(30) Foreign Application Priority Data

May 30, 2016 (DE) .......................... 102016109941.4

(51) Int. Cl.
*B29C 64/393* (2017.01)
*B29C 64/20* (2017.01)
*B33Y 10/00* (2015.01)
*B33Y 30/00* (2015.01)
(Continued)

(52) U.S. Cl.
CPC ............ *B29C 64/393* (2017.08); *B22F 10/20* (2021.01); *B23K 26/342* (2015.10); *B28B 1/001* (2013.01);
(Continued)

(58) Field of Classification Search
CPC ..... B29C 64/393; B29C 64/386; B29C 64/20; B29C 64/153; B22F 10/20; B22F 10/30;
(Continued)

(56) References Cited

U.S. PATENT DOCUMENTS 5,143,663 A 9/1992 Leyden et al.
9,902,113 B2 2/2018 Matsumoto et al.
(Continued)

FOREIGN PATENT DOCUMENTS

DE 102007029052 A1 1/2009
DE 102010024226 A1 12/2011
(Continued)

*Primary Examiner* — Michael J Brown
(74) *Attorney, Agent, or Firm* — Dority & Manning, P.A.

(57) ABSTRACT

A method for additive manufacturing of an object, in particular a hybrid object, based on a data record describing an object to be additively manufactured, includes providing a data record describing the object to be additively manufactured, subdividing the data record into at least two sub-data records, wherein a first sub-data record describes a first sub-object forming a first object part of the object to be additively manufactured, and at least one other sub-data record describes another sub-object forming another object part of the object to be additively manufactured, forming the first sub-object based on the first sub-data record in a first additive construction process, and forming the at least one other sub-object based on the at least one other sub-data record in at least one separate other additive construction process, wherein the at least one other sub-object is formed at least partially, especially completely, on the first sub-object.

15 Claims, 2 Drawing Sheets

(51) Int. Cl.
*B33Y 50/02* (2015.01)
*B29C 64/153* (2017.01)
*B33Y 50/00* (2015.01)
*B29C 64/386* (2017.01)
*B22F 10/20* (2021.01)
*B23K 26/342* (2014.01)
*B28B 1/00* (2006.01)
*B28B 17/00* (2006.01)
*B22F 10/30* (2021.01)

(52) U.S. Cl.
CPC ........ *B28B 17/0081* (2013.01); *B29C 64/153* (2017.08); *B29C 64/20* (2017.08); *B29C 64/386* (2017.08); *B33Y 10/00* (2014.12); *B33Y 30/00* (2014.12); *B33Y 50/00* (2014.12); *B33Y 50/02* (2014.12); *B22F 10/30* (2021.01)

(58) Field of Classification Search
CPC ......... B33Y 50/00; B33Y 10/00; B33Y 30/00; B33Y 50/02; B23K 26/342; B28B 1/001; B28B 17/0081; Y02P 10/25

USPC ........................................................ 700/119
See application file for complete search history.

(56) References Cited

U.S. PATENT DOCUMENTS

| | | | |
|---|---|---|---|
| 2016/0167310 A1* | 6/2016 | Lee | B29C 64/386 700/98 |
| 2017/0189966 A1 | 7/2017 | Giannozzi et al. | |
| 2017/0246811 A1* | 8/2017 | Donovan | H04N 1/405 |

FOREIGN PATENT DOCUMENTS

| | | |
|---|---|---|
| DE | 102013223411 A1 | 5/2015 |
| EP | 2266727 A1 | 12/2010 |
| JP | H11235624 A | 8/1999 |
| WO | 2011023714 A1 | 3/2011 |
| WO | 2016078800 A1 | 5/2016 |

* cited by examiner

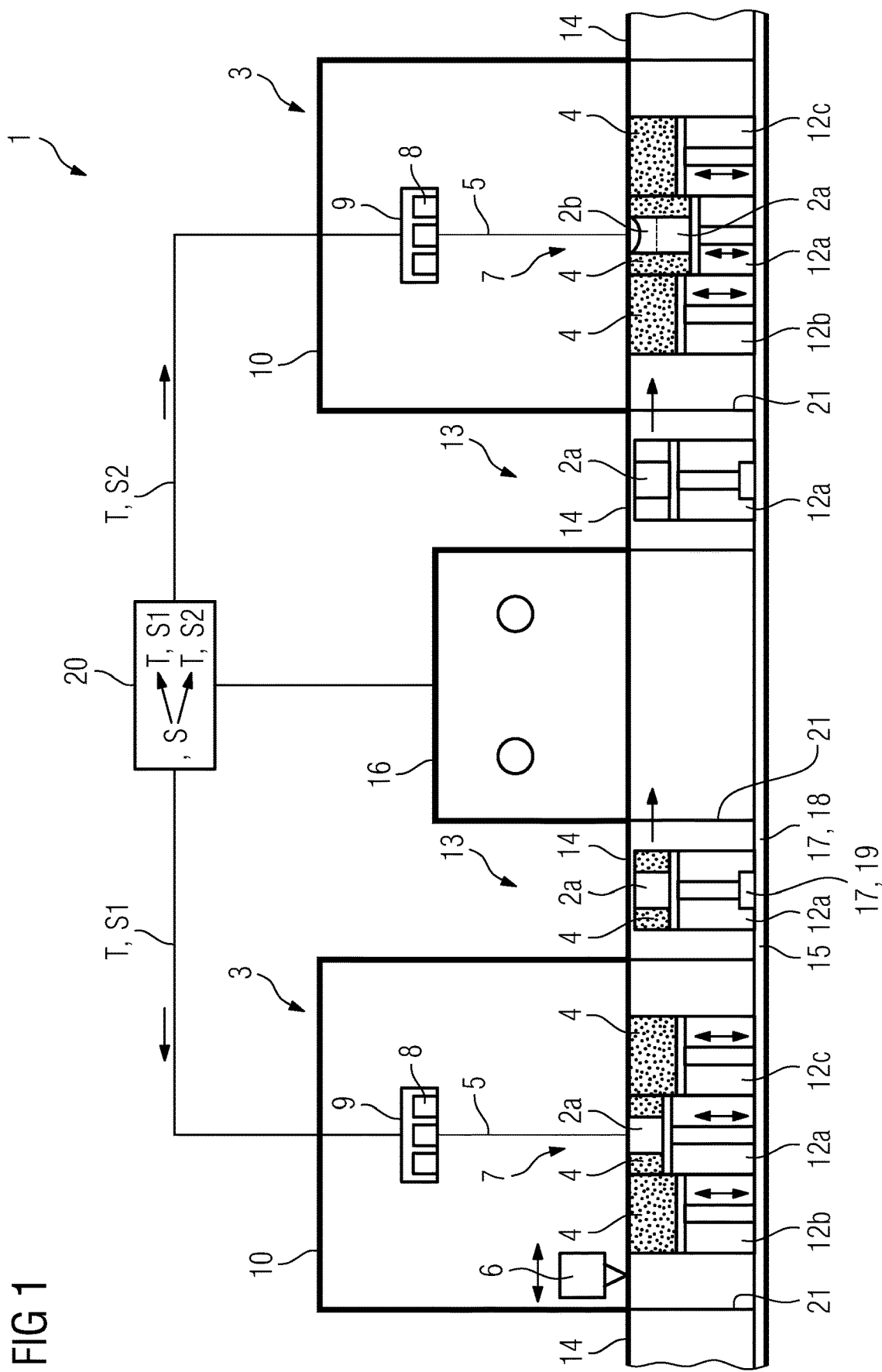

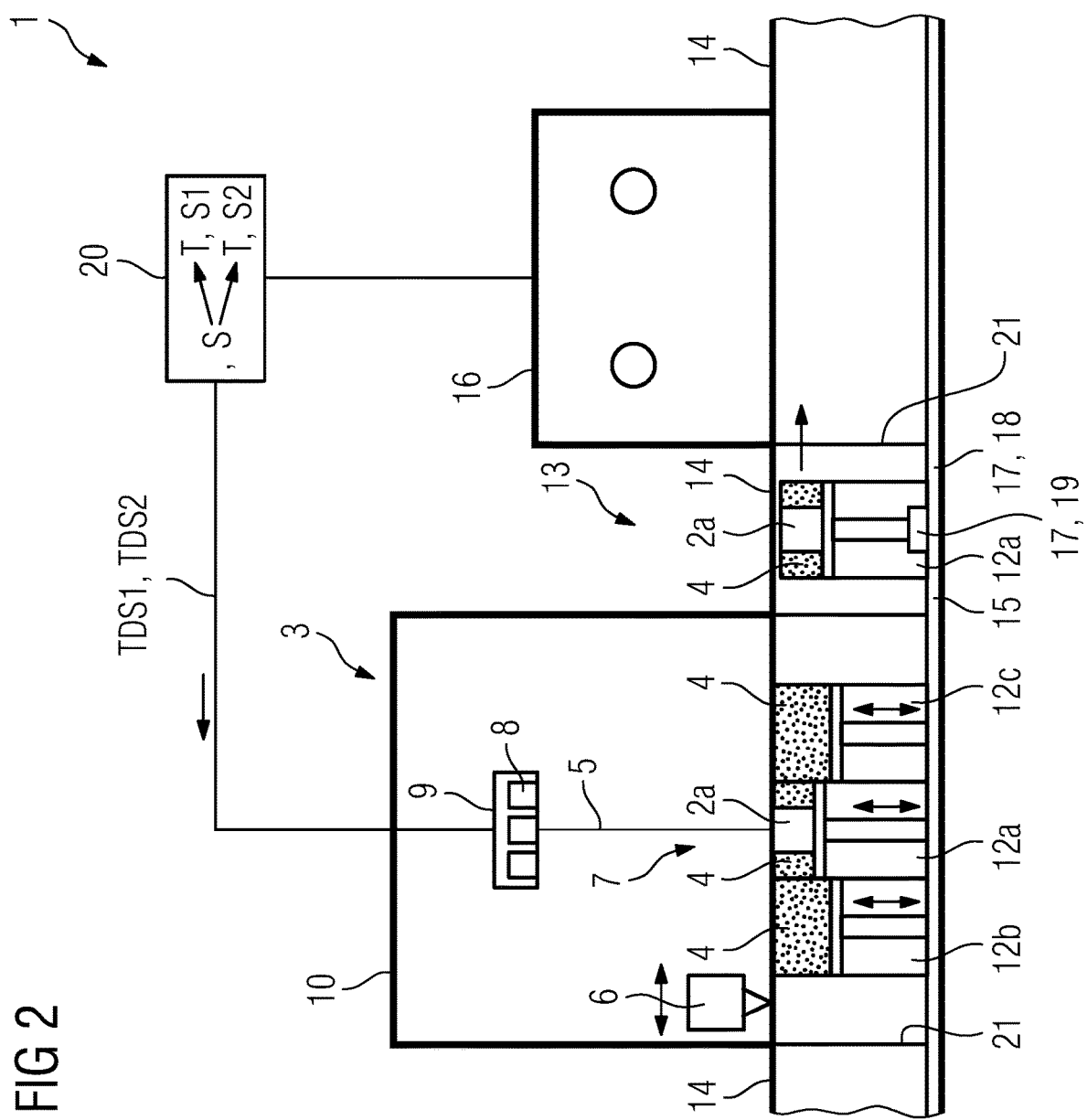

METHOD AND SYSTEM FOR THE ADDITIVE MANUFACTURING OF AN OBJECT

CROSS-REFERENCE TO RELATED APPLICATIONS

This application is a United States national stage entry of an International Application serial no. PCT/EP2017/056663 filed Mar. 21, 2017 which claims priority to German Patent Application serial no. 10 2016 109 941.4 filed May 30, 2016. The contents of these applications are incorporated herein by reference in their entirety as if set forth verbatim.

The invention relates to a method and a system for additive manufacturing of objects.

Corresponding methods and systems for additive manufacturing of objects are known. Additive manufacture is here performed by successive, selective layer-by-layer solidification of construction material layers by means of at least one energy beam. Successive, selective layer-by-layer solidification of the construction material layers is performed based on a data record describing the respective object to be additively manufactured.

Objects may be manufactured with different object properties by using appropriate methods. One example is the production of "hybrid objects", which consist of a first object part which is not additively manufactured and a further object part which is additively manufactured. In the course of manufacture of corresponding hybrid objects, the second object part is "built up" additively on the first object part.

The manufacture of corresponding hybrid objects accordingly comprises two manufacturing steps involving different processes, namely a non-additive, for example material-removing, manufacturing step and a subsequent, additive manufacturing step. This sequence of non-additive and additive manufacturing steps requires further development with regard to efficiency and process integration of the overall object production process.

The object of the present invention is that of providing a method for additive manufacturing of objects which is an improvement thereover.

Said object is achieved by a method according to claim 1 and a system according to claim 10. The respective dependent claims relate to particular embodiments of the method or of the system.

The method described herein serves in general in the additive or generative manufacture of typically three-dimensional objects, i.e. for example industrial components or industrial component assemblies. The additive manufacture of corresponding objects proceeds by successive, selective layer-by-layer solidification of construction material layers, i.e. of layers of a solidifiable construction material, by means of at least one energy beam. The solidifiable construction material may be a metal, plastics or ceramic powder. A metal, plastics or ceramic powder may also be understood to mean a powder mixture of different metals, plastics or ceramics. A metal powder may in this respect also be a powder of a metal alloy. The energy beam may be a laser beam. The method may accordingly be a selective laser melting method (SLM method for short) or a selective laser sintering method (SLS method for short).

Successive, selective layer-by-layer exposure and the associated successive, selective layer-by-layer solidification of the construction material layers in each case to be selectively solidified for additive manufacturing of an object is performed based on a data record describing the object to be additively manufactured. The data record generally describes the geometric (structural) shape of the object to be additively manufactured. The data record may for example be layer data ("slice data") derived for example from CAD data relating to the object to be additively manufactured and containing a breakdown of the object to be additively manufactured into individual layers ("slices") arranged one on top of the other, or the data record may contain such layer data. The data record typically also contains orientation data, which describe the orientation of the object which is to be or has been additively manufactured in the process chamber, i.e. in particular relative to the respective exposure device, of an additive construction apparatus.

In a first step of the method, a corresponding data record is provided. The data record is typically provided to a control device, which is configured to process the data record provided. The control device typically forms a component part of a system for additive manufacturing of objects which is configured to perform the method described herein, or a component part of a functional component, such as for example an additive construction apparatus, of such a system. The data record may be provided to the control device for example via mobile or stationary data storage devices, global or local data networks, i.e. for example the Internet or an intranet, etc.

In a second step of the method, the data record provided is subdivided data-wise into at least two sub-data records, i.e. into a first sub-data record and into at least one further sub-data record. The first sub-data record describes a first sub-object forming a first object portion of object part of the object to be additively manufactured, and the at least one further sub-data record describes a further sub-object forming a further object portion or object part of the object to be additively manufactured. In principle, the data record may be subdivided into any desired number of sub-data records; the object may accordingly be subdivided into any desired number of object parts or sub-objects. As will become clear below, the first sub-object and the at least one further sub-object in any event jointly form the object to be additively manufactured (overall object).

Subdivision of the data record into the at least two sub-data records may be performed based on at least one subdivision criterion that can be predetermined or is predetermined.

Subdivision of the data record typically proceeds taking account of at least the geometric (structural) shape of the object to be additively manufactured. The geometric (structural) shape of the object to be additively manufactured may accordingly be used as the subdivision criterion. For example, a first sub-data record may describe a geometrically (structurally) definable or defined first object part and a further sub-data record may describe a further geometrically (structurally) definable or defined object part. A geometrically (structurally) definable or defined object part may for example be a polygonal or round or roundish object part, when viewed for example in cross-section.

The functional shape of the object to be additively manufactured may also be used as a subdivision criterion. For example, a first sub-data record may describe a first object part functionally definable or defined with regard to use of the object to be additively manufactured and a further sub-data record may describe a further object part functionally definable or defined with regard to use of the object to be additively manufactured. A functionally definable or defined object part may for example be a connecting portion, via which the object may be connected to a connection partner, a shaping portion, via which a shaping function of the object may be achieved, or a tool portion, via which a tool function of the object may be achieved. It is of course also possible for a user of the method to subdivide a data record into a plurality of sub-data records according to individual specifications. Subdivision of the data record into a plurality of sub-data records may in any event proceed based on various, optionally differently weighted, subdivision criteria.

In a third step of the method, formation, i.e. additive build-up, of the first sub-object takes place based on the first sub-data record. Formation of the first sub-object is performed in a first additive construction process.

In a fourth step of the method, formation, i.e. additive build-up, of the at least one further sub-object is performed based on the at least one further sub-data record. The further sub-object is here formed at least partially, in particular completely, on the previously formed first sub-object. In the course of formation of the further sub-object, stable, optionally bonded, connection of the first sub-object and the further sub-object typically takes place. Formation of the further sub-object is performed in a further additive construction process separate from the first additive construction process. Formation of the first sub-object and of the further sub-object thus does not take place in the same additive construction process. The first additive construction process is completed once the first sub-object is finished, and the further additive construction process is completed once the further sub-object is finished. On completion of all the further additive construction processes, the object to be additively manufactured is finished.

The procedure described enables the production of objects which comprise object parts with different object properties. According to the method, all the object parts are formed additively in separate additive construction processes. The method described herein is thus improved with regard to the efficiency and process integration of the overall manufacturing process for objects with different object properties.

The method is particularly advantageous for the manufacture of the above-mentioned hybrid objects, which have hitherto been produced from a non-additively manufactured object part and an additively manufactured object part. The method makes it possible to manufacture corresponding hybrid objects wholly additively. Therefore, those object parts which have not hitherto been manufactured additively are also now formed additively using the method.

The first sub-object and the at least one further sub-object or in general at least one further sub-object may be formed in the same additive construction apparatus or in different additive construction apparatuses. The method described herein may therefore be produced using one or more additive construction apparatuses. If a plurality of additive construction apparatuses are used, the number of additive construction apparatuses may correspond to the number of sub-objects each to be additively formed. The method may (also) be performed without difficulty where the object or respective sub-objects are formed in different additive construction apparatuses, since the sub-data records used to form the respective sub-objects originate from the same original data record. The respective sub-data records accordingly also contain the orientation data inferrable from the original data record, which describe the orientation of the object or respective sub-objects in the respective process chamber, i.e. in particular relative to a respective exposure device. Typically complex reorientation of the respective sub-objects is accordingly not necessary.

If the same additive construction apparatus is used to form the first sub-object and the at least one further sub-object, at least one construction process parameter mentioned in greater detail further below is appropriately changed prior to formation of the further sub-object.

As indicated further above, the first sub-object may be formed with at least one different object parameter than the at least one further sub-object. The first sub-object may thus differ from the further sub-object in at least one object parameter. The method accordingly allows sub-objects with different object parameters to be manufactured. An object parameter should in principle be understood to be any parameter which (directly) relates to the additively manufactured object or sub-object.

One example of an object parameter which may be used is a geometric parameter describing at least one geometric (structural) property of the object or sub-object. The first sub-object may accordingly differ from a further sub-object with regard to at least one geometric parameter. Specifically, a geometric parameter may for example be the height, width or length or longitudinal and/or cross-sectional geometry, etc. The first sub-object may thus for example have a different height, width or length, or a different longitudinal and/or cross-sectional geometry, etc. from the further sub-object.

Another example of an object parameter which may be used is a physical, in particular mechanical, parameter describing at least one physical, in particular mechanical, property of the object or sub-object. The first sub-object may accordingly (also) differ from a further sub-object with regard to at least one physical parameter. Specifically, a physical parameter may for example be density, strength, rigidity, hardness, surface texture, in particular surface quality or roughness, etc. The first sub-object may thus for example have a different density, strength, rigidity, hardness, surface texture, in particular surface quality or roughness, etc. from the further sub-object.

The method described herein furthermore makes it possible for the first sub-object to be formed with at least one different construction process parameter than the at least one further sub-object. The first additive construction process may thus differ in at least one construction process parameter from the subsequent further additive construction process. The method accordingly enables additive construction processes to be performed using different construction process parameters. A construction process parameter should in principle be taken to mean any parameter which (directly) relates to the respective additive construction process for manufacturing the object or respective sub-objects. It goes without saying that various object parameters may also be deliberately influenced via the selection of specific construction process parameters.

For example, a construction material parameter describing at least one property of the construction material used for forming the respective sub-object may be used as the construction process parameter. The first additive construction process may thus differ in at least one construction material parameter from a further subsequent additive construction process. Specifically, a construction material parameter may for example be the chemico-physical structure or chemico-physical composition, the particle shape or distribution thereof, the particle size or the distribution thereof, etc. of the construction material used for additive formation of the respective sub-object. It is therefore possible for a different construction material with regard to chemico-physical structure and/or particle shape and/or particle size to be used in the first additive construction process than in a subsequent further additive construction process.

The method accordingly allows objects to be produced, for example, which comprise different object parts from different construction materials.

At least one energy beam parameter influencing at least one beam property of the energy beam used respectively for selective solidification of respective construction material layers may be used as construction process parameter. The first additive construction process may thus (also) differ in at least one energy beam parameter from a subsequent further additive construction process. Specifically, an energy beam parameter may for example comprise beam velocity, beam intensity, beam movement pattern, etc. It is therefore possible for a different energy beam with regard to beam velocity, beam intensity or beam movement pattern to be used in the first additive construction process than in a subsequent further additive construction process. According to the method, for example a first additive construction process may be performed with a high beam intensity and a high beam velocity and a further subsequent additive construction process may be performed with a comparatively low beam intensity and a comparatively low beam velocity.

In addition, at least one layer property influencing at least one layer property of respective construction material layers to be selectively solidified may additionally be used. The first additive construction process may thus (also) differ in at least one layer parameter from a further subsequent additive construction process. Specifically, a layer parameter may for example comprise layer number, layer density, layer thickness, layer surface quality, layer temperature, etc. It is therefore possible for different construction material layers with regard to layer number layer density, layer thickness, layer surface quality and/or layer temperature to be used in the first additive construction process than in a subsequent further additive construction process. The method thus for example allows construction material layers with different layer thicknesses to be selectively solidified for example in a first additive construction process than in a subsequent further additive construction process.

A system for additive manufacturing of objects is used to perform the method described herein. The system is consequently configured to perform the method.

The invention therefore relates not only to the method but also to a system for performing the method. The system comprises at least one control device configured for subdivision of a data record provided thereto describing an object to be additively manufactured into at least two sub-data records, wherein a first sub-data record describes a first sub-object forming a first object part of the object to be additively manufactured, and at least one further sub-data record describes a further sub-object forming a further object part of the object to be additively manufactured, and at least one additive construction apparatus, wherein the additive construction apparatus is configured for additive formation or manufacture of the first sub-object based on the first sub-data record, and/or for additive formation or manufacture of the at least one further sub-object based on the at least one further sub-data record.

All the explanations given in connection with the method described herein likewise apply to the system described herein. Conversely, all the explanations given in connection with the system described herein likewise apply to the method described herein.

The additive construction apparatus(es) belonging to the system is/are each provided with all the functional components necessary for performing additive construction processes. The corresponding functional components include for example a coater device for forming construction material layers to be selectively solidified in a construction plane and an exposure device, for example comprising one or more exposure elements configured as laser (diode) elements or comprising such, for exposing a construction material layer to be selectively solidified with an energy or laser beam for selective solidification of a construction material layer formed by means of the coater device in a construction plane. The functional components are typically arranged in a housing structure of the additive construction apparatus which may also be designated or considered as a machine housing and may optionally be rendered inert.

The system may comprise a plurality of additive construction apparatuses, wherein a first additive construction apparatus or a group of first additive construction apparatuses is configured (in each case) to form a first sub-object based on a first sub-data record and at least one further additive construction apparatus or a group of further additive construction apparatuses is configured (in each case) to form at least one further sub-object based on at least one further sub-data record.

The system comprises may comprise at least one modular functional unit (hereinafter "functional unit"). The modular structure of such a functional unit results from a housing structure to be designated "module", in which the respective functional component parts of the functional unit are accommodated. The housing structure determines the outer geometric shape of the functional unit.

A functional unit may in particular take the form of a construction module. A construction module comprises at least one construction plate or support plate supported movably, in particular height adjustably, relative to a base body of the construction module in a, typically chamber-like, receiving space ("construction chamber"), on which construction or support plate additive build-up of at least one object may take place. A construction module serves, in the course of carrying out the method, in particular for mounting an object or sub-object to be additively manufactured during performance of an additive construction process.

A functional unit may also take the form of a dispensing module. A dispensing module comprises at least one, typically chamber-like, receiving space configured to receive construction material to be solidified and optionally a dispensing device for dispensing a specific quantity of construction material to be solidified from the receiving space. A dispensing module serves, in the course of carrying out the method, in particular in providing (dispensing) a specific quantity of construction material to be solidified which is distributed uniformly in a construction plane by means of a coater device, forming a defined construction material layer.

A functional unit may however also take the form of an overflow module. An overflow module comprises at least one, typically chamber-like, receiving space configured to receive unsolidified construction material. The overflow module serves, in the course of carrying out the method, in particular to accommodate unsolidified construction material which is to be or has been removed from a construction or process chamber of the additive construction apparatus.

Finally, a functional unit may also take the form of a handling module. A handling module comprises at least one, typically chamber-like, receiving space configured to receive at least one additively manufactured object. A suitable interface may provide the possibility of access to the receiving space for "shaking out" the finished object. Access may proceed by way of an operator ("glovebox") or by way of a robot.

Irrespective of its specific functional configuration, a respective functional unit is mobile; as will become clear below, a respective functional unit may accordingly be moved (to and fro) between different stationary, i.e. immobile, component parts of the system typically connected firmly to a base.

The system may comprise a tunnel structure. The tunnel structure has at least one tunnel portion in or through which at least one functional unit can be moved. In a respective tunnel portion at least one movement path or movement track (hereinafter "movement path") is provided along which a functional unit can be moved through the tunnel portion. It is of course possible to provide a plurality of movement paths at least in places in one tunnel portion, i.e. for example movement paths arranged adjacent one another, in particular parallel, in one or more planes. A corresponding movement path may allow guided movement of a functional unit in or through the respective tunnel portion.

A respective tunnel portion defines at least one cavity, in which at least one functional unit is movable. Moreover, the geometric-structural configuration of a respective tunnel portion may be selected as desired, with the proviso that at least one functional unit be movable therein or therethrough. A respective tunnel portion may for example have a round, roundish or polygonal cross-sectional geometry. With regard to its longitudinal extent, a respective tunnel portion may have a linear profile at least in places, in particular completely, or a bent or curved profile at least in places, in particular completely. Of course, a respective tunnel portion may be formed from a plurality of tunnel portion segments, which may be or are connected together to form the respective tunnel portion.

A respective tunnel portion may lead into at least one further tunnel portion, for example extending at an angle thereto. The tunnel structure may, similarly to a track or rail system known from rail transport, comprise a plurality of tunnel portions leading into one another at defined positions. A plurality of tunnel portions may extend next to, over or under one another at least in places. The tunnel structure may accordingly comprise a plurality of tunnel portions extending at least in places next to, over or under one another and therefore in different (horizontal and/or vertical) planes.

It may be possible to render a respective tunnel portion inert, i.e. an inert atmosphere may be produced and maintained therein. Likewise, a specific pressure level, i.e. for example an excess or reduced pressure, may be produced and maintained in a respective tunnel portion.

For connection with the tunnel structure, individual, a plurality of or all of the stationary component parts of the system may have a connecting portion via which they may be or are connected with the tunnel structure. In particular, the additive construction apparatuses belonging to the system each have at least one connecting portion, via which they may be or are connected with the tunnel structure. Functional units are accordingly movable from the additive construction apparatus into the tunnel structure or from the tunnel structure into the additive construction apparatuses belonging to the system.

It is also possible for at least one tunnel portion of the tunnel structure to be arranged or formed in respective stationary component parts of the system, in particular in additive construction apparatuses, which tunnel portion communicates via the respective connecting portion with at least one tunnel portion arranged or formed outside the respective stationary component part of the system.

The function of the tunnel structure or of the tunnel portions belonging thereto consists in directly or indirectly connecting together at least two different stationary component parts of the system, i.e. for example by interposing at least one further tunnel portion and/or one further stationary component part of the system. The connection of respective stationary component parts of the system enables to and fro movement of respective functional units between respective stationary component parts of the system. The tunnel structure in particular allows fully automated movement of respective functional units. By way of one or more tunnel portions, it is for example possible to connect a first stationary additive construction apparatus ("first construction station") belonging to the system and in which according to the method a first additive construction process for forming a first sub-object is being or has been carried out to a further stationary additive construction apparatus ("further construction station"), in which according to the method a further additive construction process for forming a further sub-object is being or has been carried out.

It is in principle possible for the movement path along which a functional unit, i.e. for example a construction module, is moved from a first stationary component part of the system back into a further stationary component part of the system to be different from the movement path along which the respective functional unit was moved from the first stationary component part into the further stationary component part of the system. A movement path of a functional unit between respective stationary component parts of the system may be selected on the basis of prioritization of specific functional units. For example, for higher priority functional units movement paths which are shorter or quicker distance-wise may be selected than for lower priority functional units. Equally, higher priority functional units may for example be moved at a comparatively high speed compared to lower priority functional units.

The system comprises at least one conveying device for moving respective functional units. The conveying device may be coupled to a (motor-powered) drive device, via which a drive force may be generated which sets at least one functional unit in motion.

The conveying device may comprise at least one conveying means arranged or formed on the tunnel structure, which conveying means is configured to set a functional unit in motion. Such a conveying means may for example be a mechanical conveying means, i.e. for example a belt, chain or roller conveyor, which defines by its spatial extent within a respective tunnel portion a conveying path, and thus a movement path, along which a functional unit can be moved. A corresponding conveying means may be arranged or formed for example on the base or wall of a tunnel portion The or a conveying device may comprise at least one conveying means arranged on the functional unit and configured to set the functional unit provided therewith in motion. Such a conveying means may for example be a(n electric) motor-powered drive device integrated into a respective functional unit. In this way, the freedom of movement of a functional unit may be extended, since rotational movements about a vertical axis are possible, for example.

All the movements of the functional units movable or moved in the system, in particular in the tunnel structure, are controlled via a central control device, which is configured to communicate directly or indirectly with respective functional units, e.g. by radio. To this end, the functional units are conveniently provided with suitable communication devices. All the information relevant for moving respective functional units within the system or the tunnel structure, i.e. in particular respective movement information, i.e. for example speed information, respective position information, i.e. for example start and destination information, respective prioritization information, etc., is conveniently present in the control device. Control of the movements of the functional units moved in the system or in the tunnel structure may be fully automated.

The invention is explained in greater detail with reference to the exemplary embodiments shown in the following figures, in which:

FIGS. 1 and 2 each show a schematic diagram of a system for additive manufacturing of three-dimensional objects according to an exemplary embodiment; and FIG. 3 shows a schematic diagram of a three-dimensional object.

FIGS. 1 and 2 each show a schematic diagram of a system 1 for additive manufacturing of three-dimensional objects 2, i.e. for example industrial components or industrial component assemblies, in side view according to an exemplary embodiment. The systems 1 may be systems for performing selective laser melting methods (SLM methods for short) or selective laser sintering methods (SLS methods for short).

The systems 1 shown in FIGS. 1 and 2 differ in the number of additive construction apparatuses 3 ("construction stations") respectively belonging thereto for additive manufacturing of three-dimensional objects 2: the system 1 shown in FIG. 1 comprises a plurality of additive construction apparatus(es) 3, while the system 1 shown in FIG. 2 comprises just one additive construction apparatus 3.

The additive construction apparatuses 3 belonging to the systems 1 each comprise all the functional components necessary for carrying out additive construction processes. Corresponding functional components include a coater device 6, supported movably as indicated in FIGS. 1 and 2 by the horizontally oriented double-headed arrow, for forming construction material layers to be selectively exposed in a construction plane 7 and an exposure device 9 comprising one or more exposure elements 8, formed for example as laser diode elements or comprising such, for selective exposure of a construction material layer to be selectively exposed formed by means of the coater device 6 in the construction plane 7. The functional components are arranged in a housing structure 10, defining a process chamber 11, of the additive construction apparatus 3. The process chamber 11 may be rendered inert, it accordingly being possible to form or maintain a protective gas atmosphere, for example an argon atmosphere, and/or a specific pressure level in the process chamber 11.

Systems 1 each comprise a plurality of modular functional units 12. The modular structure of the functional units 12 results from a housing structure (not described in any greater detail), to be designated "module" and (substantially) determining the outer geometric shape of the respective functional unit 12, in which the respective functional component parts of the respective functional unit 12 are accommodated.

The functional units 12 in particular take the form of construction modules 12a. The construction modules 12a comprise a construction or support plate (not described in any greater detail), on which a three-dimensional object 2 may be additively built up and which is supported movably, in particular height adjustably, relative to a base body of the construction module 12a in a chamber-like receiving space (not described in any greater detail) also to be designated "construction chamber". The construction modules 12a accordingly serve in supporting objects 2 to be additively manufactured while an additive construction process is carried out.

Further functional units 12 may optionally take the form of dispensing modules 12b. The dispensing modules 12b comprise a chamber-like receiving space (not described in any greater detail) configured to receive construction material 4 to be solidified and a dispensing device (not described in any greater detail) for dispensing a specific quantity of construction material 4 to be solidified from the receiving space. The dispensing modules 12b serve in providing (dispensing) a specific quantity of construction material 4 to be solidified which is distributed uniformly in the construction plane 7 by means of the coater device 6 to form a defined construction material layer.

Further functional units may optionally further take the form of overflow modules 12c. The overflow modules 12c comprise a chamber-like receiving space (not described in any greater detail) configured to receive unsolidified construction material 4. The overflow modules 12c serve to receive unsolidified construction material 4 which is to be or has been removed from the process chamber 11 of an additive construction apparatus 3.

Finally, further functional units (not shown) may optionally take the form of handling modules. The handling modules comprise a chamber-like receiving space (not described in any greater detail) configured to receive an additively manufactured object 2. A suitable interface (not shown) may provide the possibility of access to the receiving space for "shaking out" the object 2. Access may proceed by way of an operator ("glovebox") or by way of a robot.

Although it is primarily the construction modules 12a which are mentioned hereinafter, any of the stated different functional units 12 may be moved to and fro between various stationary, i.e. immobile, component parts of the system 1 typically connected firmly with a base.

To this end, the system 1 comprises a tunnel structure 13. The tunnel structure 13 comprises a plurality of tunnel portions 14 in which or through which the functional units 12 can be moved. At least one movement path 15 along which a functional unit 12 can be moved through a respective tunnel portion 14 is formed in the respective tunnel portion 14. A movement path 15 allows guided movement of a functional unit 12 in or through the respective tunnel portion 14. A plurality of movement paths 15 may also be formed in a tunnel portion 14 at least in places. The tunnel portions 14 may be capable of being rendered inert, i.e. an inert atmosphere or a specific pressure level, i.e. for example an excess or reduced pressure, may be formed and maintained therein.

The function of the tunnel structure 13 or of the tunnel portions 14 belonging thereto consists in connecting together different stationary component parts of the system 1, i.e. for example different additive construction apparatuses 3, directly or indirectly, i.e. for example by interposing at least one further tunnel portion 14 and/or one further stationary component part of the system 1. The connection of respective stationary component parts of the system 1 enables to and fro movement of respective functional units 12 between respective stationary component parts of the system 1. As shown by way of example in FIG. 1, a first additive construction apparatus 3 may be connected via a tunnel portion 14, here with the interposition of a shake-out apparatus 16 ("shake-out station") for "shaking out" additively manufactured objects 2, with a further additive construction apparatus 3.

For moving respective functional units 12, the system 1 comprises a conveying device 17 comprising a (motor-powered) drive device, via which a drive force may be generated which sets a functional unit 12 in motion. The conveying device 17 may comprise a conveying means 18 arranged or formed on the tunnel structure. The conveying means 18 is configured to set a functional unit 12, in the figure a construction module 12a, in motion as indicated by the respective arrows. The conveying means 18 may for example be a mechanical conveying means, i.e. for example a belt, chain or roller conveyor, which defines by its spatial extent within a respective tunnel portion 14 a conveying path, and thus a movement path 15. It is apparent from FIGS. 1 and 2 that a conveying means 18 on the tunnel structure may for example be configured at the base of a wall of a tunnel portion 14.

FIGS. 1 and 2 also depict the possibility of the conveying device 17 comprising conveying means 19 on the functional unit. The conveying means 19 are configured to set the functional units 12 provided therewith in motion. Such a conveying means 19 may for example be a(n electric) motor-powered drive device (not described in any greater detail) integrated into a respective functional unit 12. In this way, the freedom of movement of a functional unit 12 may be extended, since rotational movements about a vertical axis are possible, for example.

For connection with the tunnel structure 13, the stationary component parts of the system 1 comprise connecting portions 21, via which they are connected with the tunnel structure 13. FIGS. 1 and 2 show connecting portions 21 of additive construction apparatuses 3 and a shake-out apparatus 16. It is additionally shown that, in respective stationary component parts of the system 1, tunnel portions 14 of the tunnel structure 13 are also provided which communicate via respective connecting portions 21 with tunnel portions 14 formed outside the respective stationary component parts of the system 1.

All the movements of the functional units 12 movable or moved in the system 1, in particular in the tunnel structure 13, are controlled via a central control device 20, which is configured to communicate directly or indirectly with respective functional units 12, e.g. by radio. To this end, the functional units 12 are provided with suitable communication devices (not shown). All the information relevant for moving respective functional units 12 within the system 1 or the tunnel structure 13, i.e. in particular respective movement information, i.e. for example speed information, respective position information, i.e. for example start and destination information, respective prioritization information, etc., is conveniently present in the control device 20. Control of the movements of the functional units 12 moved in the system 1 or in the tunnel structure 13 may be fully automated.

The systems 1 shown in FIGS. 1 and 2 allow the method described below for additive manufacturing of three-dimensional objects 2 to be implemented.

The method serves in the additive manufacture of objects 2, i.e. for example industrial components or industrial component assemblies. Additive manufacture of corresponding objects proceeds accordingly by successive, selective layer-by-layer solidification of construction material layers by means of an energy beam 5. The method may be a selective laser melting method (SLM method for short) or a selective laser sintering method (SLS method for short).

Successive, selective layer-by-layer exposure and the associated successive, selective layer-by-layer solidification of the construction material layers to be selectively solidified for additive manufacturing of an object 2 is performed based on a data record DS describing the object 2 to be additively manufactured. The data record DS generally describes the geometric (structural) shape of the object 2 to be additively manufactured. The data record DS may for example be layer data ("slice data") derived for example from CAD data relating to the object 2 to be additively manufactured and containing a breakdown of the object 2 to be additively manufactured into individual layers ("slices") arranged one on top of the other. The data record DS also contains orientation data, which describe the orientation of the object 2 which is to be or has been additively manufactured in the process chamber 11, i.e. in particular relative to the respective exposure device 9, of an additive construction apparatus 3.

In the first step of the method, a corresponding data record DS is provided. The data record DS is provided to a control device, i.e. for example the control device 20 shown in FIGS. 1 and 2, which is configured to process the data record DS. The data record DS may be provided to the control device for example via mobile or stationary data storage devices, global or local data networks, i.e. for example the Internet or an intranet, etc.

In the second step of the method, the data record DS provided is subdivided data-wise into a plurality of, hereinafter for example two, sub-data records TDS1 and TDS2. The first sub-data record TDS1 describes a first sub-object 2a forming a first object portion of object part of the object 2 to be additively manufactured, and the second sub-data record TDS2 describes a further sub-object 2b forming a further object portion or object part of the object 2 to be additively manufactured. It is clear from FIG. 3, which shows a schematic diagram of the object 2, that the first sub-object 2b and the second sub-object 2b jointly form the object 2 (overall object) to be additively manufactured.

Subdivision of the data record DS into the two sub-data records TDS1, TDS2 may be performed based on at least one subdivision criterion that can be predetermined or is predetermined.

The geometric shape of the object 2 to be additively manufactured may be used as the subdivision criterion. The first sub-data record TDS1 may describe a geometrically definable or defined first object part and the second data record TDS2 may describe a geometrically definable or defined second object part. It is apparent from FIG. 3 that geometrically definable or defined object parts may comprise a polygonal object part (when viewed in cross-section), cf. sub-object 2a, and a round or roundish object part when viewed in cross-section, cf. sub-object 2b.

The functional shape of the object 2 to be additively manufactured may also be used as a subdivision criterion. For example, a first sub-data record TDS1 may describe a first object part functionally defined with regard to use of the object 2 to be additively manufactured and the second sub-data record TDS2 may describe a further object part functionally differently defined with regard to use of the object 2 to be additively manufactured. The functionally defined first object part, cf. first sub-object 2a, may for example be a connecting portion, via which the object 2 may be connected to a connection partner, while the functionally defined second object part, cf. second sub-object 2b, may for example be a shaping portion, via which a shaping function of the object 2 may be achieved.

In the third step of the method, formation, i.e. additive build-up, of the first sub-object 2a takes place based on the first sub-data record TDS1. Formation of the first sub-object 2a is performed in a first additive construction process. The first sub-data record TDS1 is available to a control device controlling the first construction process. The first additive construction process is completed once the first sub-object 2a is finished.

In the fourth step of the method, formation, i.e. additive build-up, of the second sub-object 2b takes place based on the second sub-data record TDS2. Formation of the second sub-object 2b is performed in a second additive construction process separate from the first additive construction process. The second sub-data record TDS2 is available to a control device controlling the second construction process. The second additive construction process is completed once the second sub-object 2b is finished. On completion of the second additive construction process, the overall object 2 to be additively manufactured is finished.

The second sub-object 2b is formed at least partially, in particular completely, on the previously formed first sub-object 2a. In the course of formation of the second sub-object 2b, stable, optionally bonded, connection of the first sub-object 2a and the second sub-object 2b takes place.

The method is particularly advantageous for the manufacture of hybrid objects, which have hitherto been produced from a non-additively manufactured object part and an additively manufactured object part. The method makes it possible to manufacture corresponding hybrid objects wholly additively. Therefore, those object parts which have not hitherto been manufactured additively are also now formed additively using the method.

It is apparent from FIG. 1 that the first sub-object 2a and the second sub-object 2b may be formed in different additive construction apparatuses 3. Once the first sub-object 2a is finished, the construction module 12a receiving the first sub-object 2a is moved out of the first additive construction apparatus 3, cf. the left-hand additive construction apparatus 3, via the tunnel structure 13 into the second additive construction apparatus 3, cf. right-hand additive construction apparatus 3. It is of course possible for the first sub-object 2a to be "shaken out" in the shake-out apparatus 16 arranged between the two additive construction apparatuses 3 prior to movement into the second additive construction apparatus 3.

The method may be performed without difficulty where the object 2 or respective sub-objects 2a, 2b are formed in different additive construction apparatuses 3, since the sub-data records TDS1, TDS2 used to form the respective sub-objects 2a, 2b originate from the same original data record DS. The respective sub-data records TDS1, TDS2 accordingly also contain the orientation data inferrable from the original data record DS, which describe the orientation of the object 2 or respective sub-objects 2a, 2b in the respective process chamber 11, i.e. in particular relative to a respective exposure device 9. Complex reorientation of the sub-object 2a is accordingly not necessary.

It is apparent from FIG. 2 that the first sub-object 2a and the second sub-object 2b may also be formed in the same additive construction apparatus 3. Once the first sub-object 2a is finished, the construction module 12a receiving the first sub-object 2a may be moved out of the first additive construction apparatus 3, via the tunnel structure 13. Before the construction module 12a receiving the first sub-object 2a is moved back into the additive construction apparatus 12a, to form the second sub-object 2b, the first sub-object 2a may be "shaken out" in the shake-out apparatus 16 arranged between the two additive construction apparatuses 3. At least one construction process parameter is typically changed in the additive construction apparatus 3 prior to formation of the further sub-object 2b. As will become apparent below, this should be understood to mean, for example, a change in construction material 4.

The method thus makes it possible for the first sub-object 2a to be formed with at least one different construction process parameter than the second sub-object 2b. The first additive construction process may thus differ in at least one construction process parameter from the subsequent second additive construction process. A construction process parameter should in principle be taken to mean any parameter which (directly) relates to the respective additive construction process for manufacturing the object 2 or respective sub-objects 2a, 2b.

A construction material parameter describing one property of the construction material 4 used for forming the respective sub-object 2a, 2b may be used as the construction process parameter. The first additive construction process may thus differ in a construction material parameter from a subsequent further additive construction process. Specifically, a construction material parameter may for example be the chemico-physical structure or chemico-physical composition, the particle shape or distribution thereof, the particle size or the distribution thereof, etc. of the construction material 4 used for additive formation of the respective sub-object 2a, 2b. It is therefore possible for a different construction material to be used in the first additive construction process than in a following further additive construction process. The method accordingly allows objects 2 (hybrid objects) to be produced which comprise different object parts from different construction materials 4.

An energy beam parameter influencing at least one beam property of the energy beam 5 used respectively for selective solidification of respective construction material layers may be used as construction process parameter. The first additive construction process may thus (also) differ in an energy beam parameter from a subsequent further additive construction process. Specifically, an energy beam parameter may for example comprise beam velocity, beam intensity, beam movement pattern, etc. According to the method, a first additive construction process may be performed with a high beam intensity and a high beam velocity and a subsequent further additive construction process may be performed with a comparatively low beam intensity and a comparatively low beam velocity.

In addition, at least one layer property influencing a layer property of respective construction material layers to be selectively solidified may additionally be used. The first additive construction process may thus (also) differ in one layer parameter from a further subsequent additive construction process. Specifically, a layer parameter may for example comprise layer number, layer density, layer thickness, layer surface quality, layer temperature, etc. The method thus for example allows construction material layers with different layer thicknesses to be selectively solidified in a first additive construction process than in a subsequent further additive construction process.

In principle, the first sub-object 2a may be formed with at least one different object parameter than the second sub-object 2b. The first sub-object 2a may thus differ in at least one object parameter from the second sub-object 2b. The method accordingly allows sub-objects with different object parameters to be manufactured. An object parameter should in principle be understood to be any parameter which (directly) relates to the additively manufactured object 2 or sub-object 2a, 2b.

A geometric parameter describing at least one geometric property of the object 2 or sub-object 2a, 2b may be used as object parameter. Specifically, a geometric parameter may for example be the height, width or length or longitudinal and/or cross-sectional geometry, etc. The first sub-object may thus for example have a different height, width or length, or a different longitudinal and/or cross-sectional geometry, etc. from the further sub-object. FIG. 3 for example shows different cross-sectional geometries for the two sub-objects 2a, 2b.

A physical, in particular mechanical, parameter describing at least one physical, in particular mechanical, property of the object or sub-object may also be used as object parameter. Specifically, a physical parameter may for example be density, strength, rigidity, hardness, surface texture, in particular surface quality or roughness, etc. The first sub-object 2a may thus for example have a different density, strength, rigidity, hardness, surface texture, in particular surface quality or roughness, etc. from the further sub-object 2b.

LIST OF REFERENCE NUMERALS

1 System
2 Object
2a, 2b Sub-object
3 Additive construction apparatus
4 Construction material
5 Energy beam
6 Coater device
7 Construction plane
8 Exposure element
9 Exposure device
10 Housing structure
11 Process chamber
12 Functional unit
12a Construction module
12b Dispensing module
12c Overflow module
13 Tunnel structure
14 Tunnel portion
15 Movement path
16 Shake-out apparatus
17 Conveying device
18 Conveying means
19 Conveying means
20 Control device
21 Connecting portion

The invention claimed is:

1. A method for additive manufacturing of an object by successive, selective layer-by-layer solidification of construction material layers, said method comprising:
  providing a data record describing the object to be additively manufactured,
  subdividing the data record into at least two sub-data records, wherein a first sub-data record describes a first sub-object forming a first object part of the object to be additively manufactured and orientation data of the object, and wherein a second sub-data record describes a second sub-object forming a second object part of the object to be additively manufactured and the orientation data of the object,
  forming the first sub-object based on the first sub-data record in a first additive construction process, the first sub-object having a first orientation corresponding to the orientation data of the object, and
  forming the second sub-object based on the second sub-data record in at least one separate other additive construction process, the second sub-object having a second orientation corresponding to the orientation data of the object, wherein the second sub-object is formed at least partially on the first sub-object.

2. The method according to claim 1, wherein the subdivision of the data record into the at least two sub-data records is performed based on at least one subdivision criterion that can be predetermined or is predetermined.

3. The method according to claim 1, wherein the first sub-object is formed with at least one different object parameter than the second sub-object.

4. The method according to claim 3, wherein the at least one different object parameter comprises:
  a geometric parameter describing at least one geometric property of the object to be additively manufactured, and/or
  a mechanical parameter describing at least one mechanical property of the object to be additively manufactured.

5. The method according to claim 1, wherein the first sub-object is formed with at least one different construction process parameter than the second sub-object.

6. The method according to claim 5, wherein the at least one different construction process parameter comprises:
  a construction material parameter describing at least one property of the construction material to be used for forming the respective sub-object,
  an energy beam parameter influencing at least one beam property of the energy beam used for the selective solidification of respective construction material layers, and/or
  a layer parameter influencing at least one layer property of respective construction material layers to be selectively solidified.

7. The method according to claim 1, wherein the first sub-object and the second sub-object are formed in the same additive construction apparatus.

8. The method according to claim 7, wherein prior to forming the second sub-object, at least one construction process parameter is changed.

9. The method according to claim 1, wherein for performing the method a system for additive manufacturing of objects is used, said system comprising:
  at least one movable modular functional unit having a reception room configured for the reception of construction material,
  a tunnel structure having at least one tunnel portion configured for movement of at least one modular functional unit therethrough, and
  at least one additive construction apparatus, wherein the additive construction apparatus has at least one connecting portion with which the additive construction apparatus can be connected with or is connected with the tunnel structure such that the at least one modular functional unit can be moved from the additive construction apparatus into the tunnel structure or from the tunnel structure into the additive construction apparatus.

10. The method according to claim 1, wherein the second sub-object is formed completely on the first sub-object.

11. The method according to claim 1, wherein the first sub-object and the second sub-object are formed in different additive construction apparatuses.

12. A system for additive manufacturing of objects, the system comprising:
  at least one control device configured to subdivide a data record describing an object to be additively manufactured into at least two sub-data records, wherein a first sub-data record describes a first sub-object forming a first object part of the object to be additively manufactured and orientation data of the object, and a second sub-data record describes a second sub-object forming a second object part of the object to be additively manufactured and the orientation data of the object,
at least one additive construction apparatus, the at least one additive construction apparatus configured for:
additive manufacturing of the first sub-object based on the first sub-data record in a first orientation corresponding to the orientation data of the object; and
additive manufacturing of the second sub-object at least partially on the first sub-object and based on the at second sub-data record in a second orientation corresponding to the orientation data of the object.

13. The system according to claim 12, wherein the system comprises a plurality of additive construction apparatuses, wherein a first additive construction apparatus is configured for forming the first sub-object, and a second additive construction apparatus is configured for forming the second sub-object.

14. The system according to claim 12, further comprising:
at least one movable modular functional unit having a reception room provided for the reception of construction material,
a tunnel structure having at least one tunnel portion configured for movement of at least one modular functional unit therethrough, wherein the at least one additive construction apparatus has at least one connecting portion with which the additive construction apparatus can be connected with or is connected with the tunnel structure such that a modular functional unit can be moved from the additive construction apparatus into the tunnel structure or from the tunnel structure into the additive construction apparatus.

15. The system according to claim 14, wherein the functional unit comprises a construction module which comprises a reception room provided for the reception of a construction plate on which an object can be additively manufactured, and which is movably supported relative to a base body of the construction module.

* * * * *